US009263962B2

(12) United States Patent
Yang et al.

(10) Patent No.: US 9,263,962 B2
(45) Date of Patent: Feb. 16, 2016

(54) POWER CONVERSION SYSTEM AND METHOD

(71) Applicant: General Electric Company, Schenectady, NY (US)

(72) Inventors: Wenqiang Yang, Shanghai (CN); Hongwu She, Shangai (CN); Rajendra Naik, Bangalore (IN); Shivkumar Venkatraman Iyer, Karnataka (CN)

(73) Assignee: General Electric Company, Schenectady, NY (US)

( * ) Notice: Subject to any disclaimer, the term of this patent is extended or adjusted under 35 U.S.C. 154(b) by 6 days.

(21) Appl. No.: 14/449,181

(22) Filed: Aug. 1, 2014

(65) Prior Publication Data

US 2015/0035284 A1 Feb. 5, 2015

(30) Foreign Application Priority Data

Aug. 2, 2013 (CN) .......................... 2013 1 0334563

(51) Int. Cl.
  *F03D 9/00* (2006.01)
  *H02P 9/04* (2006.01)
  *H02M 5/42* (2006.01)
  *H02M 5/45* (2006.01)
  (Continued)

(52) U.S. Cl.
  CPC . *H02M 5/42* (2013.01); *H02M 1/12* (2013.01); *H02M 7/5395* (2013.01); *H02M 2001/007* (2013.01); *H02M 2001/0074* (2013.01); *H02M 2001/0077* (2013.01); *Y10T 307/707* (2015.04)

(58) Field of Classification Search
  USPC ........................................ 290/44, 55; 363/37
  See application file for complete search history.

(56) References Cited

U.S. PATENT DOCUMENTS 4,864,483 A * 9/1989 Divan ................. H02M 5/4585
                                                            363/132
5,225,712 A * 7/1993 Erdman ................ F03D 7/0272
                                                            290/44

(Continued)

FOREIGN PATENT DOCUMENTS

GB          2432267 A      5/2007
WO      2012143904 A2     10/2012

OTHER PUBLICATIONS

Office Action issued in connection with corresponding DK Application No. PA201470472 on Mar. 5, 2015.

(Continued)

*Primary Examiner* — Pedro J Cuevas
(74) *Attorney, Agent, or Firm* — Global Patent Operation; Douglas D. Zhang

(57) ABSTRACT

An exemplary power conversion system includes a first power conversion module, a second power conversion module, and a controller. The first power conversion module includes a first source side converter, a first load side converter, and a first DC link coupled between the first source side converter and the second load side converter. The second power conversion module includes a second source side converter, a second load side converter, and a second DC link coupled between the second source side converter and the second load side converter. The controller is configured to generate a number of switching signals according to a circuit structure of the power source module or a circuit structure of the load module. The switching signals are provided to the first power conversion module and the second power conversion module to balance a first DC link voltage and a second DC link voltage.

20 Claims, 13 Drawing Sheets

(51) Int. Cl.
*H02M 1/12* (2006.01)
*H02M 7/5395* (2006.01)
*H02M 1/00* (2007.01)

(56) References Cited

U.S. PATENT DOCUMENTS

| | | | |
|---|---|---|---|
| 5,841,644 A * | 11/1998 | Lipo | H02M 7/4826 363/132 |
| 6,262,906 B1 | 7/2001 | Salzmann et al. | |
| 6,812,586 B2 * | 11/2004 | Wacknov | H02P 9/04 290/40 B |
| 7,239,036 B2 * | 7/2007 | D'Atre | F03D 7/0272 290/44 |
| 7,243,006 B2 * | 7/2007 | Richards | G06F 17/5036 318/801 |
| 7,286,906 B2 * | 10/2007 | Richards | G06F 17/5036 700/286 |
| 7,394,166 B2 * | 7/2008 | Teichmann | H02J 3/38 290/44 |
| 7,414,331 B2 | 8/2008 | Datta | |
| 7,573,732 B2 | 8/2009 | Teichmann et al. | |
| 7,586,216 B2 * | 9/2009 | Li | F03D 7/0248 307/151 |
| 7,939,959 B2 | 5/2011 | Wagoner et al. | |
| 7,978,445 B2 * | 7/2011 | Ritter | H02P 9/007 290/44 |
| 7,986,062 B2 * | 7/2011 | Jakeman | H02J 1/00 307/151 |
| 8,169,179 B2 | 5/2012 | Mohan et al. | |
| 8,664,788 B1 * | 3/2014 | Wagoner | F03D 7/0244 290/44 |
| 8,897,040 B2 * | 11/2014 | Holliday | H02H 9/04 363/37 |
| 8,907,510 B2 * | 12/2014 | Wagoner | H02P 9/007 290/44 |
| 8,934,276 B2 * | 1/2015 | Teo | H02M 7/487 363/131 |
| 8,976,556 B2 * | 3/2015 | Teo | H02M 7/487 363/123 |
| 9,077,262 B2 * | 7/2015 | Melanson | H02M 1/14 |
| 9,083,261 B2 * | 7/2015 | Yang | H02M 5/458 |
| 2003/0163296 A1 * | 8/2003 | Richards | G06F 17/5036 703/14 |
| 2007/0021873 A1 * | 1/2007 | Richards | G06F 17/5036 700/286 |
| 2007/0177314 A1 * | 8/2007 | Weng | F03D 9/003 361/20 |
| 2007/0273155 A1 * | 11/2007 | Barton | H02J 3/1892 290/44 |
| 2007/0279815 A1 * | 12/2007 | Li | F03D 7/0248 361/54 |
| 2008/0084070 A1 * | 4/2008 | Teichmann | H02J 3/38 290/55 |
| 2009/0085405 A1 | 4/2009 | Ogusa et al. | |
| 2009/0160259 A1 * | 6/2009 | Naiknaware | H02M 7/4807 307/82 |
| 2010/0091529 A1 * | 4/2010 | Jakeman | H02J 1/00 363/36 |
| 2010/0157632 A1 | 6/2010 | Batten et al. | |
| 2011/0032734 A1 * | 2/2011 | Melanson | H02M 1/14 363/37 |
| 2011/0141786 A1 | 6/2011 | Shen et al. | |
| 2012/0032622 A1 | 2/2012 | Lipo | |
| 2012/0033472 A1 | 2/2012 | Oka et al. | |
| 2012/0163044 A1 | 6/2012 | Mayor et al. | |
| 2013/0128632 A1 * | 5/2013 | Yang | H02M 7/487 363/37 |
| 2013/0134710 A1 * | 5/2013 | Yuan | H02M 1/00 290/44 |
| 2013/0181519 A1 | 7/2013 | Lee | |
| 2013/0182465 A1 | 7/2013 | Wang et al. | |
| 2013/0264879 A1 * | 10/2013 | Shih | H02J 9/005 307/66 |
| 2014/0009985 A1 * | 1/2014 | Figge | H02M 3/1584 363/65 |
| 2014/0016382 A1 * | 1/2014 | Teo | H02M 7/487 363/123 |
| 2014/0050000 A1 * | 2/2014 | Teo | H02M 7/487 363/131 |
| 2014/0346891 A1 * | 11/2014 | Kang | H03K 17/122 307/113 |
| 2014/0346962 A1 * | 11/2014 | Sanders | H05B 33/0815 315/193 |
| 2014/0347896 A1 * | 11/2014 | Chung | H02M 5/458 363/34 |

OTHER PUBLICATIONS

Grandi et al., "Dual Inverter Configuration for Grid-Connected Photovoltaic Generation Systems", Telecommunications Energy Conference, 2007. INTELEC 2007. 29th International, Issue Date: Sep. 30, 2007-Oct. 4, 2007,pp. 880-885, Print ISBN: 978-1-4244-1627-1.

Casadei et al., "Multilevel Operation and Input Power Balancing for a Dual Two-Level Inverter with Insulated DC Sources", Industry Applications, IEEE Transactions, Issue Date: Nov.-Dec. 2008, vol. 44, Issue: 6, pp. 1815-1824, ISSN: 0093-9994.

* cited by examiner

POWER CONVERSION SYSTEM AND METHOD

BACKGROUND

This disclosure generally relates to power conversion systems and methods for balancing at least a first DC link voltage and a second DC link voltage.

For most power conversion systems, switching type semiconductors (e.g., IGBTs) are commonly used and controlled to conduct current so as to accomplish a power conversion process (e.g., DC to AC and/or AC to DC). However, due to the voltage and/or current limitation of the semiconductors, it is difficult to achieve a high-power rating power conversion system. Attempts to increase voltage rating and current conduction capability have been made to handle high power.

In some power conversion systems, various new topologies are used to increase current conduction capability. For example, one topology that has been proposed is employing two or more power conversion modules with the same structure coupled in parallel in the power conversion system to increase current conduction capability. However, by increasing the load current, the conduction loss of the power conversion system increases significantly. Furthermore, it is difficult to use suitable cables and circuit breakers when the load current is too high.

In some power conversion systems, loads designed with an open-winding structure are commonly used to increase voltage rating. With the open-winding structure, the load can be supplied with power by dual power conversion modules in a push-pull manner, and each power conversion module handles half of the total voltage. In some applications, in order to control the power conversion modules in the same manner independently, it is desired that the DC link voltages in different power conversion modules can be controlled to be balanced. However, conventional strategies for balancing the DC link voltages are complex.

Therefore, it is desirable to provide systems and methods to address at least one of the above-mentioned problems.

BRIEF DESCRIPTION

One aspect of the present invention resides in a power conversion system. The power conversion system includes a first power conversion module, a second power conversion module, and a controller. The first power conversion module is coupled with a power source module via one or more first input terminals. The first power conversion module is configured to convert a first input power at the one or more first input terminals to a first output power at one or more first output terminals for providing to a load module. The first power conversion module includes a first source side converter, a first load side converter, and a first DC link coupled between the first source side converter and the first load side converter. The second power conversion module is coupled with the power source module via one or more second input terminals. The second power conversion module is configured to convert a second input power at the one or more second input terminals to a second output power at one or more second output terminals for providing to the load module. The second power conversion module includes a second source side converter, a second load side converter, and a second DC link coupled between the second source side converter and the second load side converter. The controller is in electrical communication with the first power conversion module and the second power conversion module. The controller is configured to generate a number of switching signals according to a circuit structure of the power source module or a circuit structure of the load module. The switching signals are provided to the first power conversion module and the second power conversion module to balance a first DC link voltage at the first DC link and a second DC link voltage at the second DC link.

Another aspect of the present invention resides in a method for operating a power conversion system. The method includes generating a number of switching signals according to a circuit structure of a power source module or a circuit structure of a load module. The method includes providing the switching signals to a first power conversion module and a second power conversion module to balance a first DC link voltage at a first DC link and a second DC link voltage at a second DC link.

Yet another aspect of the present invention resides in a wind power conversion system. The wind power conversion system includes a wind generator, a first power conversion module, a second power conversion module, and a controller. The wind generator is for providing a first input power at one or more first input terminals and a second input power at one or more second input terminals. The first power conversion module is coupled with the wind generator via the one or more first input terminals. The first power conversion module is configured to convert the first input power to a first output power at one or more first output terminals for providing to a power grid. The first power conversion module includes a first rectifier, a first inverter, and a first DC link coupled between the first rectifier and the first inverter. The second power conversion module is coupled with the wind generator via the one or more second input terminals. The second power conversion module is configured to convert the second input power to a second output power at one or more second output terminals for providing to a load module. The second power conversion module includes a second rectifier, a second inverter, and a second DC link coupled between the second rectifier and the second inverter. The controller is in electrical communication with the first power conversion module and the second power conversion module. The controller is configured to generate a number of source side switching signals according to a winding-structure of the generator for providing to the first rectifier and the second rectifier, to reduce the voltage difference between a first DC link voltage at the first DC link and a second DC link voltage at the second DC link.

DRAWINGS

These and other features, aspects, and advantages of the present disclosure will become better understood when the following detailed description is read with reference to the accompanying drawings in which like characters represent like parts throughout the drawings, wherein.

Figure 1:
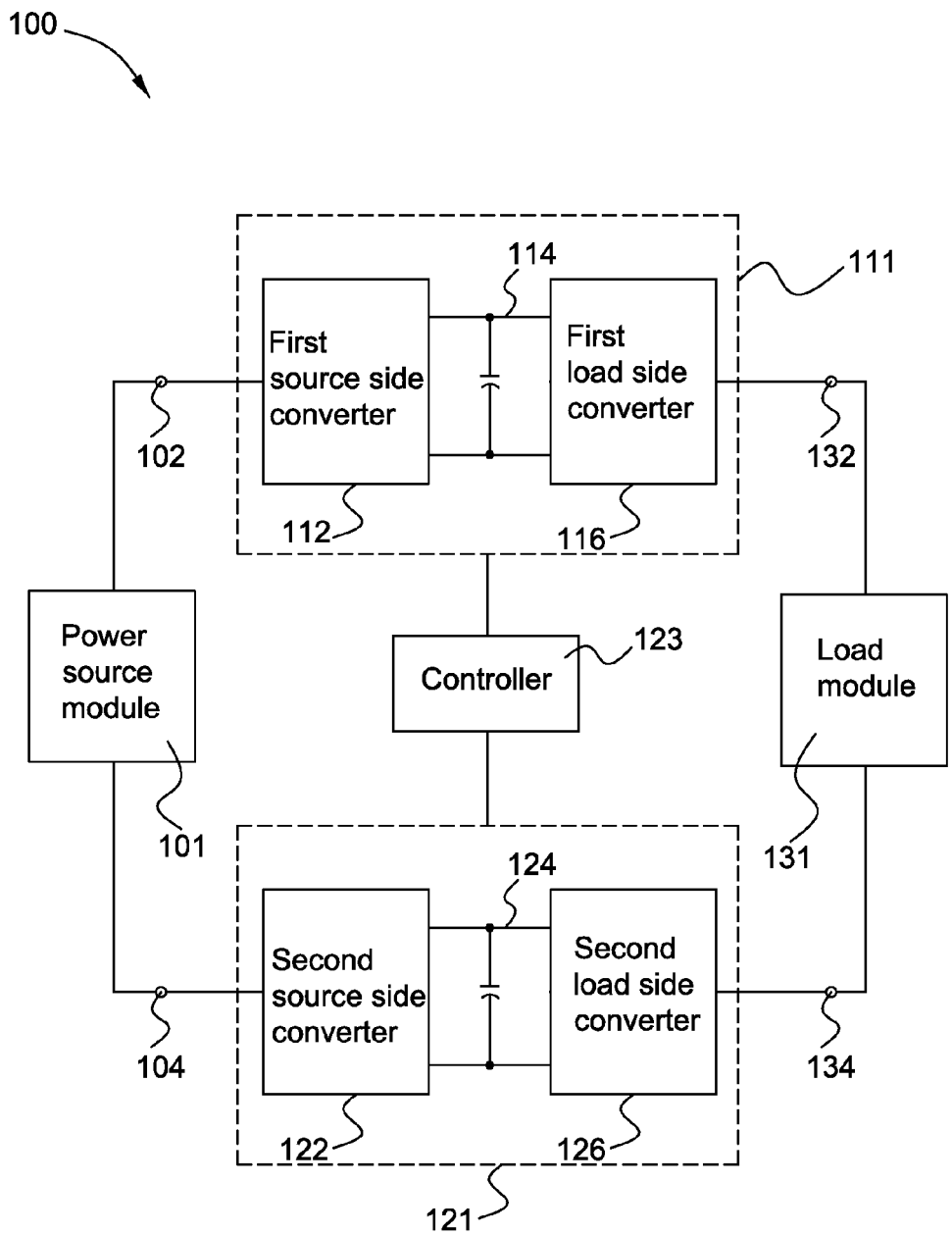
FIG. 1 is a block diagram of a power conversion system in accordance with an illustrative embodiment.
Figure 14:
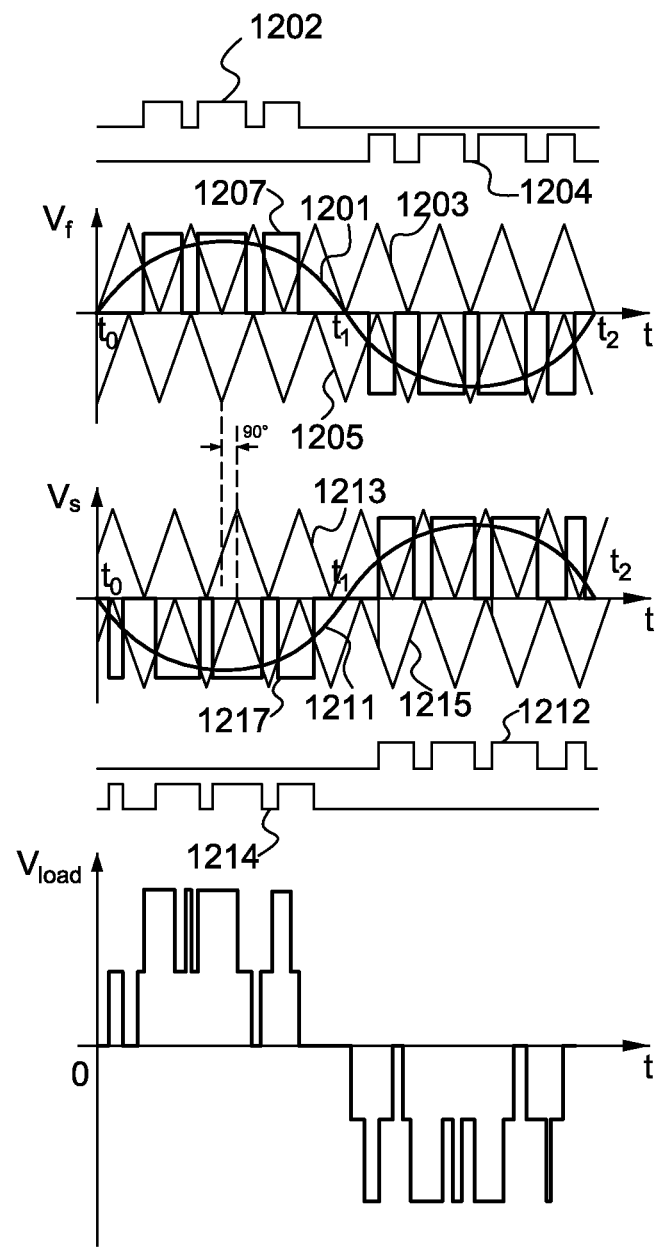
Figure 15:
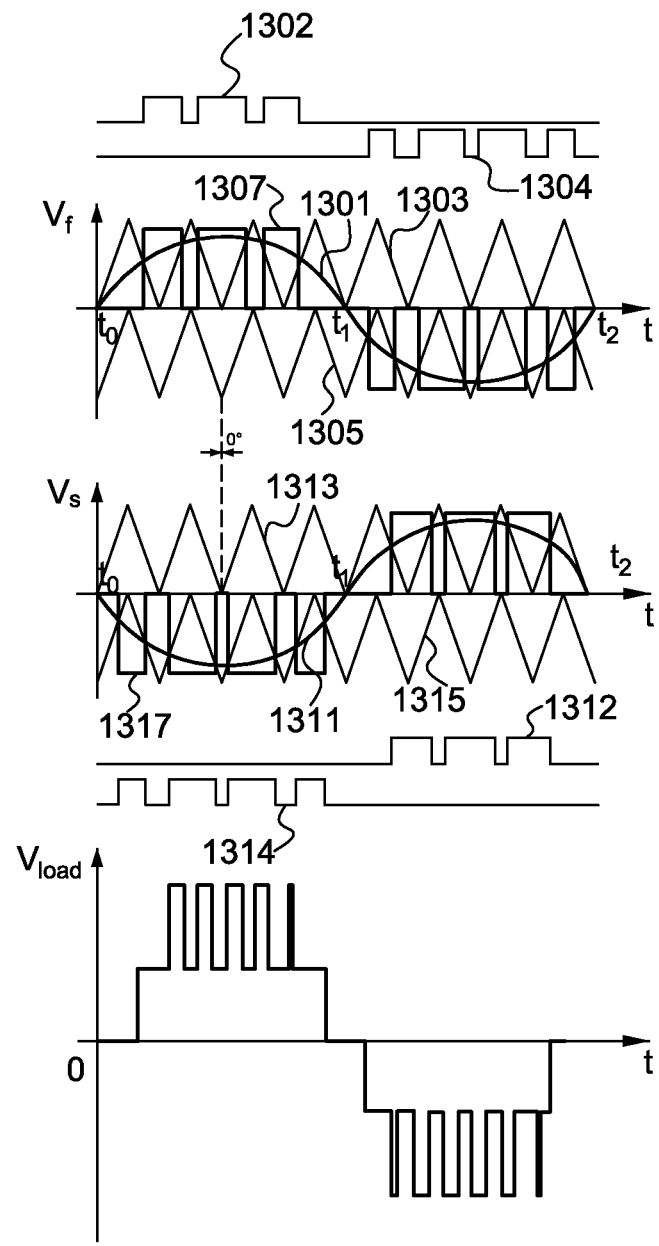

FIG. 14 is a waveform diagram illustrating various carrier and modulation waveforms of another carrier-based modulation method used in the power conversion system shown in FIG. 1 in accordance with an illustrative embodiment; and FIG. 15 is a waveform diagram illustrating various carrier and modulation waveforms of another carrier-based modulation method used in the power conversion system shown in FIG. 1 in accordance with an illustrative embodiment.

DETAILED DESCRIPTION

In an effort to provide a concise description of these embodiments, not all features of an actual implementation are described in one or more specific embodiments. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Unless defined otherwise, technical and scientific terms used herein have the same meaning as is commonly understood by one of ordinary skill in the art to which this disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either any, several, or all of the listed items. The use of "including," "comprising," or "having," and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or passive and may be optionally be connected or otherwise coupled together to provide the described function.

As used herein, the terms "may," "can," "may be," and "can be" indicate a possibility of an occurrence within a set of circumstances; a possession of a specified property, characteristic or function; and/or qualify another verb by expressing one or more of an ability, capability, or possibility associated with the qualified verb. Accordingly, usage of "may," "can," "may be," and "can be" indicate that a modified term is apparently appropriate, capable, or suitable for an indicated capacity, function, or usage, while taking into account that in some circumstances, the modified term may sometimes not be appropriate, capable, or suitable. For example, in some circumstances, an event or capacity may be expected, while in other circumstances, the event or capacity may not occur. This distinction is captured by the terms "may," "can," "may be," and "can be".

Referring to FIG. 1, a block diagram of a power conversion system 100 in accordance with an illustrative embodiment is shown. As indicated in FIG. 1, for example, the power conversion system 100 includes a power source module 101, a first power conversion module 111, a second power conversion module 121, a controller 123, and a load module 131. The power conversion system 100 is used to convert an input electrical power generated from the power source module 101 to an output electrical power for providing to the load module 131. In other embodiments, the power conversion system 100 may be used to convert electrical power generated from the load module 131 to a suitable form for supplying to the power source module 101.

As indicated in FIG. 1, for example, a single power source is used as the power source module 101 for providing a first input power at one or more first input terminals 102 and a second input electrical power at one or more second input terminals 104. Both the first input power and the second input power can include DC power and/or AC power based on the form of the single power source. The first power conversion module 111 and the second power conversion module 121 are coupled with the power source module 101 via the one or more first input terminals 102 and the one or more second input terminals 104, respectively.

As indicated in FIG. 1, for example, the first power conversion module 111 and the second power conversion module 121 can be configured with the same topology. In the illustrated embodiment, the first power conversion module 111 includes a first source side converter 112, a first load side converter 116, and a first DC link 114 coupled between the first source side converter 112 and the first load side converter 116. The first source side converter 112 is coupled with the power source module 101 via the one or more first input terminals 102, and the first load side converter 116 is coupled with the load module 131 via one or more first output terminals 132.

Similarly, the second power conversion module 121 includes a second source side converter 122, a second load side converter 126, and a second DC link 124 coupled between the second source side converter 122 and the second load side converter 124. The second source side converter 122 is coupled with the power source module 101 via the one or more second input terminals 104, and the second load side converter 126 is coupled with the load module 131 via one or more second output terminals 134.

In one embodiment, each of the first and second source side converters 112, 122, the first and second load side converters 116, 126 may include a single converter. In other embodiments, each of the first and second source side converters 112, 122, the first and second load side converters 116, 126 may include two or more converters coupled in parallel. This type of configuration can enhance the fault tolerance capability of the power conversion system 100. Once one converter in the first or second source side converters 112, 122, the first or second load side converters 116, 126 has a fault or fails, the power conversion system 100 can operate using the other functional converters.

The first power conversion module 111 is configured to convert the first input power to a first output power at the one or more first output terminals 132 for providing to the load module 131. The second power conversion module 121 is configured to convert the second input power to a second output power at the one or more second output terminals 134 for providing to the load module 131. The load module 131 operates on both of the first output power and the second output power.

For particular applications, the power source module 101 may include one or more DC power sources which supply DC electrical power to the first and second power conversion module 111, 121. In a more specific embodiment, the power source module 101 may include solar power sources, such as solar panels, and/or battery modules, such as fuel cells that can be operated to supply DC electrical power.

Regarding the DC power source module 101, the first input power is a first DC input electrical power and the second input power is a second DC input electrical power. Both of the first source side converter 112 and the second source side converter 122 include DC/DC power converters for converting the first DC input electrical power and the second DC input electrical power to a first DC link power at the first DC link 114 and a second DC link power at the second DC link 124. For particular configurations, the DC/DC power converter may include a boost circuit, a buck circuit, or any other suitable circuits which can convert a DC power into another DC power.

For particular applications, the power source module 101 supplies AC electrical power. In a more specific application, the power source module 101 includes a wind turbine, an AC generator or a power grid that can be operated to supply AC electrical power.

Regarding the AC power source module 101, the first input power is a first AC input electrical power, and the second input power is a second AC input electrical power. Both the first source side converter 112 and the second source side converter 122 include AC/DC power converters for converting the first AC input electrical power and the second AC input electrical power to a first DC link power at the first DC link 114 and a second DC link power at the second DC link 124. For particular applications, the AC/DC power converter may include an H-bridge converter, a three-phase rectifier or any other suitable circuitry which can convert an AC power into a DC power.

For particular applications, when the load module 131 operates on DC electrical power, both the first load side converter 116 and the second load side converter 126 include DC/DC power converters for converting the first DC link power and the second DC link power into a first output DC electrical power and a second output DC electrical power respectively.

For particular applications, when the load module 131 operates on AC electrical power, both the first load side converter 116 and the second load side converter 126 include DC/AC power converters for converting the first DC link power and the second DC link power into a first output AC electrical power and a second output AC electrical power respectively.

Beneficially, the dual power conversion module topology as illustrated in FIG. 1 can achieve a higher power level. Also, redundant arrangement of the power converters can help enhance the reliability of the power conversion system 100. However, DC voltages applied to each of the first and second power conversion modules 111, 121 may become unbalanced if the DC link voltages are not controlled effectively. Also, a load current waveform may be distorted and need to be optimized according to the requirements of the load module. Therefore, several control strategies/algorithms are proposed and implemented in the controller 123 to maintain a first DC link voltage at the first DC link 114 and a second DC link voltage at the second DC link 124 at the same value in a simple and effective way.

The controller 123 is in electrical communication with the first power conversion module 111 and the second power conversion module 121. The controller 123 may include any suitable programmable circuits or devices such as a digital signal processor (DSP), a field programmable gate array (FPGA), a programmable logic controller (PLC), and an application specific integrated circuit (ASIC). In some embodiments, the controller 123 may be implemented in the form of hardware, software, or a combination of hardware and software. The controller 123 is configured to generate a number of switching signals mainly according to different circuit structures of the power source module 101 or different circuit structures of the load module 131. Although a single controller 123 is illustrated to facilitate explanation, in some embodiments, two separate controllers can be arranged.

For particular configurations, when the power source module 101 includes different circuit structures, the switching signals include a number of first and second source side switching signals generated by different strategies/algorithms. The first and second source side switching signals are provided to the first source side converter 112 and second source side converter 122 respectively, for controlling the first power conversion module 111 and the second power conversion module 121 to receive the same amount of power from the power source module 101.

For these configurations, the switching signals include a number of first and second load side switching signals generated based on a voltage control strategy. The first and second load side switching signals are provided to the first load side converter 116 and the second load side converter 126 respectively to ensure all the first DC link power at the first DC link 114 and all the second DC link power at the second DC link 124 can be provided to the load module 131. By operating the first and second source side converters 112, 122 with the first and second source side switching signals, the two DC link voltages can be balanced.

For particular configurations, when the load module 131 includes different circuit structures, the switching signals include a number of first and second load side switching signals generated by different strategies. The first and second load side switching signals are provided to the first load side converter 116 and the second load side converter 126 respectively, for controlling the first power conversion module 111 and the second power conversion module 121 to provide the same amount of power to the load module 131.

For these configurations, the switching signals include a number of first and second source side switching signals generated based on a voltage control strategy, for providing to the first source side converter 112 and the second source side converter 122 respectively to ensure the power source module 101 can provide as much first input power and second input power as the load module 131 needs. By operating the first and second load side converters 116, 126 with the first and second load side switching signals, the two DC link voltages can be balanced.

When the power source module 101 includes a wind generator, and the load module 131 includes a transformer for providing an output power obtained from the first output power and the second output power to a power grid, the power conversion system 100 can be referred to as a wind power conversion system. For particular configurations of the wind power conversion system 100, a first rectifier and a second rectifier are used as the first and second source side converters 112, 122, respectively. The first and second rectifiers are used to convert a first input AC electrical power and a second input AC electrical power to the first DC link power and the second DC link power, respectively. A first inverter and a second inverter are used as the first and second load side converters 116, 126, respectively. The first and second inverters 111, 121 are used to convert the first DC link power and the second DC link power to first AC output power and second AC output power, respectively. A number of first and second source side switching signals are generated by the controller 123 according to the circuit structure or winding-structure of the wind generator to balance the first DC link voltage and the second DC link voltage.

Figure 2:
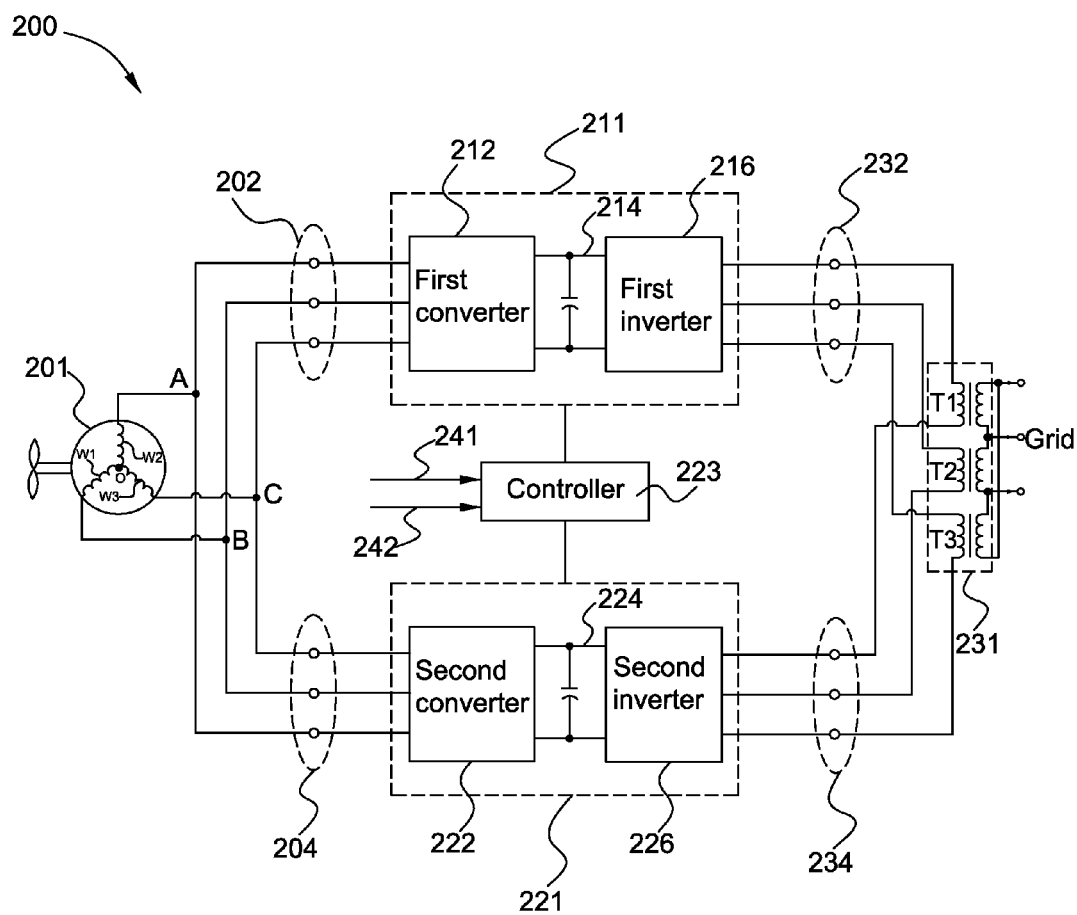
FIG. 2 is a schematic diagram of a power conversion system with a non-open-winding generator as a power source module in accordance with an illustrative embodiment.

Referring to FIG. 2, a schematic diagram of a power conversion system 200 with a non-open-winding generator as the power source module 101 shown in FIG. 1 in accordance with an illustrative embodiment is shown. The power conversion system 200 is similar to the power conversion system 100 shown in FIG. 1. The power conversion system 200 also includes a power source module 201, a first power conversion module 211, a second power conversion module 221, a controller 223, and a load module 231.

However, the first input power and the second input power are commonly supplied from a generator 201 with a non-open-winding structure. For the example arrangement shown in FIG. 2, a three-phase generator with a single set of Y-connection windings is used as the power source module 201. The generator 201 includes three windings W1, W2, and W3, and each winding includes two terminals. One terminal of each winding is tied together to form a neutral point O. The other terminals of the three windings W1, W2, and W3 are coupled with both the first power conversion module 211 and the second power conversion module 221 via corresponding input terminals A, B, and C respectively. In other embodiments, the wind generator of the power source module 201 may include any number of windings. These windings can also be connected to form other shapes, such as delta-shaped and triangular-shaped connections.

As indicated in FIG. 2, for example, a first converter 212 is used as the first source side converter and a first inverter 216 is used as the first load side converter in the first power conversion module 211. A second converter 222 is used as the second source side converter, and a second inverter 226 is used as the second load side converter in the second power conversion module 221.

For the arrangement shown in FIG. 2, the load module 131 includes an open-winding structure. Different from the non-open-winding structure (e.g., the generator 201 shown in FIG. 2), the windings are not tied together. An open-winding structure is configured with a number of separate windings, and each winding has two terminals. The two terminals of each winding are coupled to the first power conversion module 211 and the second power conversion module 221 respectively. Therefore, the open-winding load 231 is coupled with the first power conversion module 211 and the second power conversion module 221 in series to allow same amount of electrical current to flow between corresponding phase output terminal of the first inverter 116 and the second inverter 226. In some embodiments, the load module 131 includes non-open-winding structure.

As indicated in FIG. 2, for example, a three-phase open-winding transformer is used as the load module 231. The transformer 231 includes an open-winding primary side and a secondary side. In the open-winding primary side, each of three windings T1, T2, and T3 is coupled with the first inverter 216 and the second inverter 226 via first output terminals 232 and second output terminals 234. In some embodiments, the secondary side of the transformer 231 includes an open-winding structure. In some embodiments, the secondary side can provide electrical power to a power grid.

Figure 3:
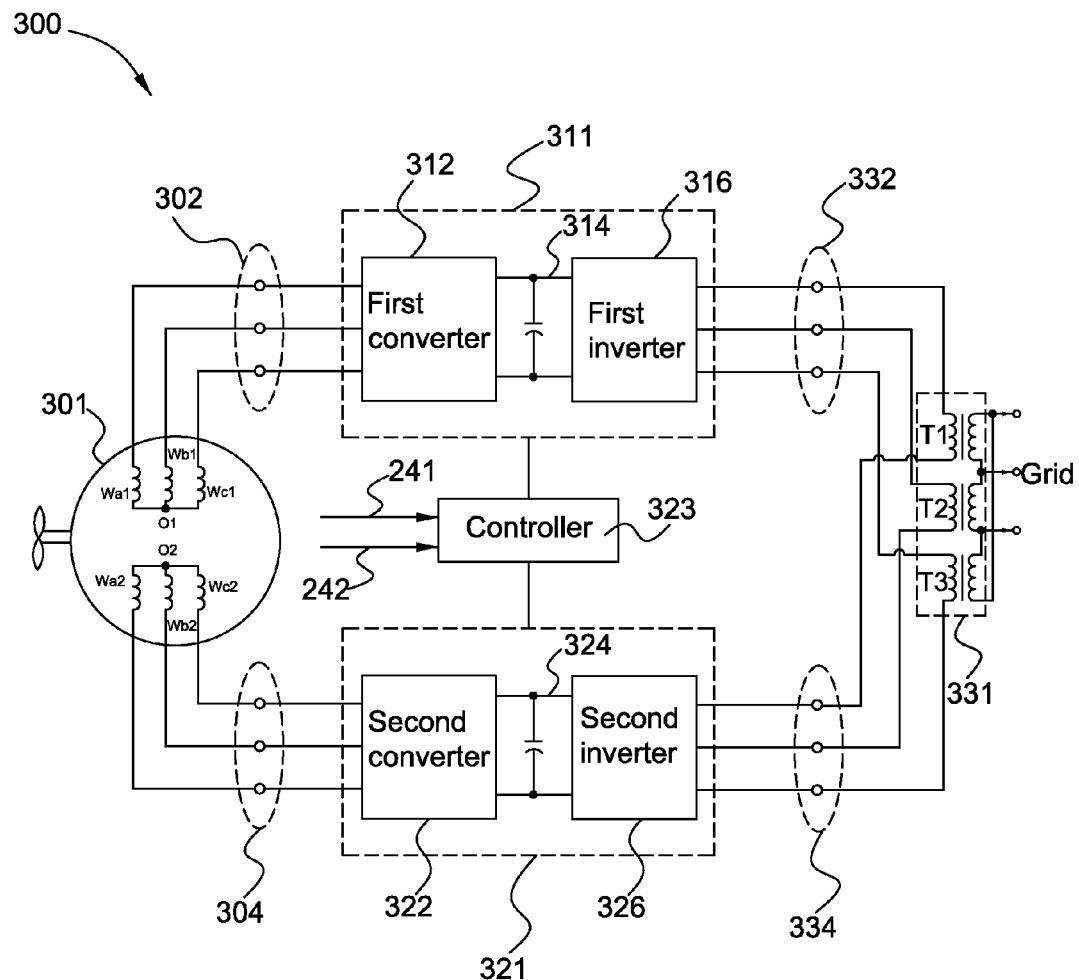
FIG. 3 is a schematic diagram of a power conversion system with a non-open-winding generator as a power source module in accordance with another illustrative embodiment.

Referring to FIG. 3, a schematic diagram of another power conversion system 300 with a non-open-winding generator as the power source module 101 shown in FIG. 1 in accordance with an illustrative embodiment is shown. Compared with the power conversion system 200 shown in FIG. 2, similarly, the power conversion system 300 also includes a power source module 301, a first power conversion module 311, a second power conversion module 321, a controller 323, and a load module 331.

However, a three-phase generator 301 with a double set of Y-connection windings is used as the power source module 301 to provide the first input power and the second input power. One set of the Y-connection windings is coupled to the first converter 312 and the neutral point O1 via three windings Wa1, Wb1, and Wc1. The other set of Y-connection windings is coupled to the second converter 322 and the neutral point O2 via three windings Wa2, Wb2, and Wc2.

Figure 4:
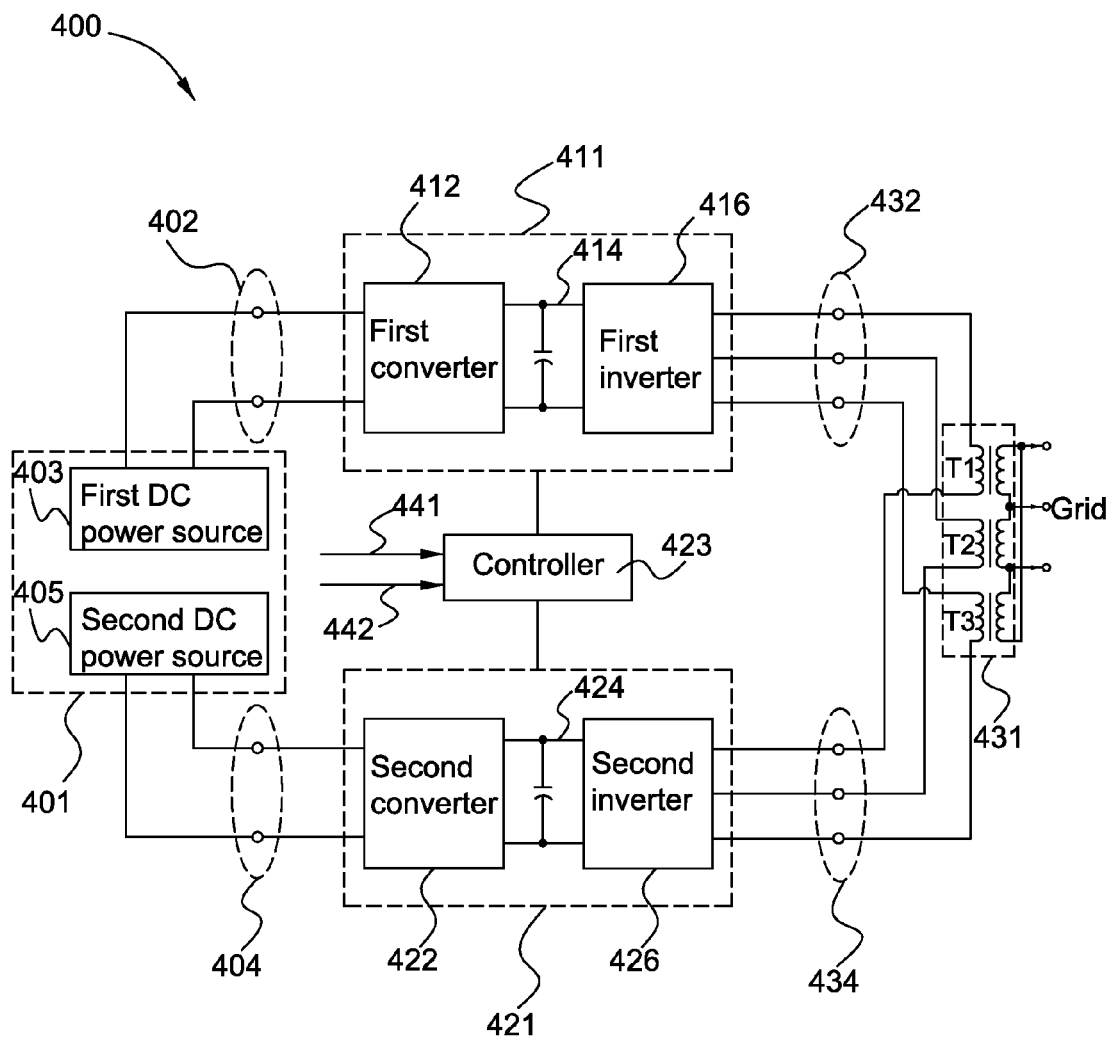
FIG. 4 is a schematic diagram of a power conversion system with dual separate power sources as a power source module in accordance with an illustrative embodiment.

Referring to FIG. 4, a schematic diagram of a power conversion system 400 with dual separate power sources as the power source module 101 shown in FIG. 1 in accordance with an illustrative embodiment is shown. Compared with the power conversion system 200 shown in FIG. 2, similarly, the power conversion system 400 also includes a power source module 401, a first power conversion module 411, a second power conversion module 421, a controller 423, and a load module 431.

However, the power source module 401 includes a first power source 403 and a second power source 405 which is separately arranged from the first power source 403. The first power source 403 is used to provide the first input power, and the second power source 405 is used to provide the second input power.

For the arrangement shown in FIG. 4, a first DC power source (e.g., a first solar panel battery, and/or fuel cell) is used as the first power source 403, and a second DC power source (e.g., a second solar panel, battery, and/or fuel cell) is used as the second DC power source 405.

Figure 5:
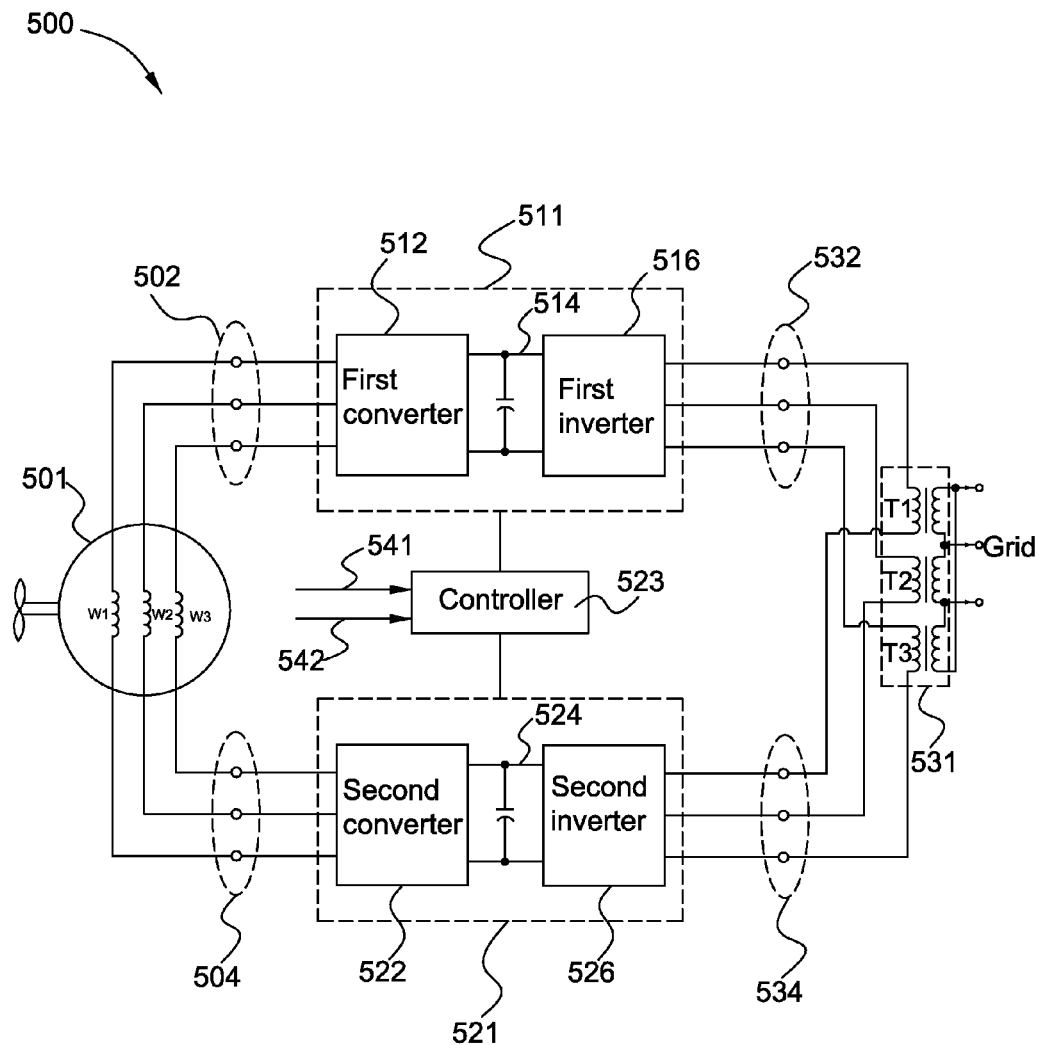
FIG. 5 is a schematic diagram of a power conversion system with an open-winding generator as a power source module in accordance with an illustrative embodiment.

Referring to FIG. 5, a schematic diagram of a power conversion system 500 with an open-winding generator as the power source module 101 shown in FIG. 1 in accordance with an illustrative embodiment is shown. Compared with the power conversion system 200 shown in FIG. 2, similarly, the power conversion system 500 also includes a power source module 501, a first power conversion module 511, a second power conversion module 521, a controller 523, and a load module 531.

However, the power source module 501 includes an open-winding generator for providing the first input power and the second input power. In the illustrated embodiment, the generator 501 is a three-phase open-winding generator. Each of three windings W1, W2, and W3 is coupled to each input three-phase of first converter 512 and second converter 522 via one of the corresponding first input terminals 502 and one of the corresponding second input terminals 504.

Figure 6:
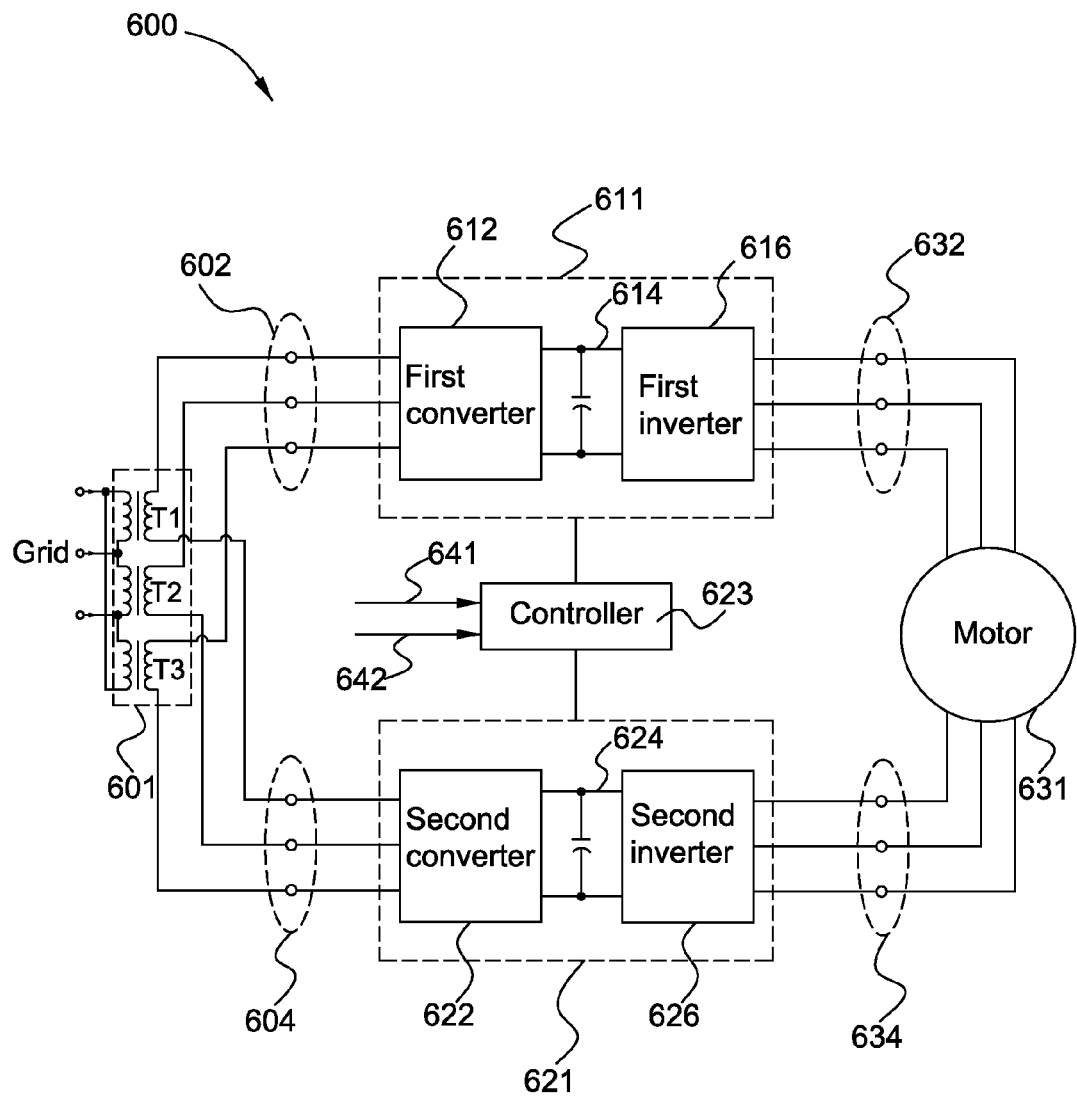
FIG. 6 is a schematic diagram of a power conversion system with a motor as a load module in accordance with an illustrative embodiment.

Referring to FIG. 6, a schematic diagram of a power conversion system 600 with a motor as the load module in accordance with an illustrative embodiment is shown. The power conversion system 600 is similar to the power conversion system 100 shown in FIG. 1. The power conversion system 600 also includes a power source module 601, a first power conversion module 611, a second power conversion module 621, a controller 623, and a load module 631.

However, the power source module 601 includes a transformer for receiving electrical power from the power grid and providing the first input power and the second input power at first input terminals 602 and second input terminals 604 respectively. In some embodiments, the transformer 601 includes an open-winding structure as indicated in FIG. 2. For particular configurations, the transformer 601 includes a non-open-winding structure.

As indicated in FIG. 6, for example, a three-phase open-winding transformer is used as the power source module 601. The transformer 601 includes a primary side and an open-winding secondary side. In the open-winding secondary side, each of three windings T1, T2, and T3 is coupled with the first converter 612 and the second converter 622 via first input terminals 602 and second input terminals 604. For particular configurations, the primary side of the transformer 601 includes an open-winding structure. For particular configurations, the primary side can receive electrical power from a power grid.

For the arrangement shown in FIG. 6, the load module 631 includes a motor coupled between the first power conversion module 611 and the second conversion module 621 via the first output terminals 632 and second output terminals 634 respectively.

For particular configurations, a motor with a non-open-winding structure such as the structure of Y-connection windings of the generator 201 shown in FIG. 2 or the double sets of Y-connection windings of the generator 301 shown in FIG. 3 is used as the motor 631. For particular configurations, a motor with delta-shaped or triangular-shaped-connection windings (not shown) may be used as the motor 631.

For particular configurations, a motor with an open-winding structure such as the structure of an open-winding generator 501 shown in FIG. 5 may be used as the motor 631.

Figure 7:
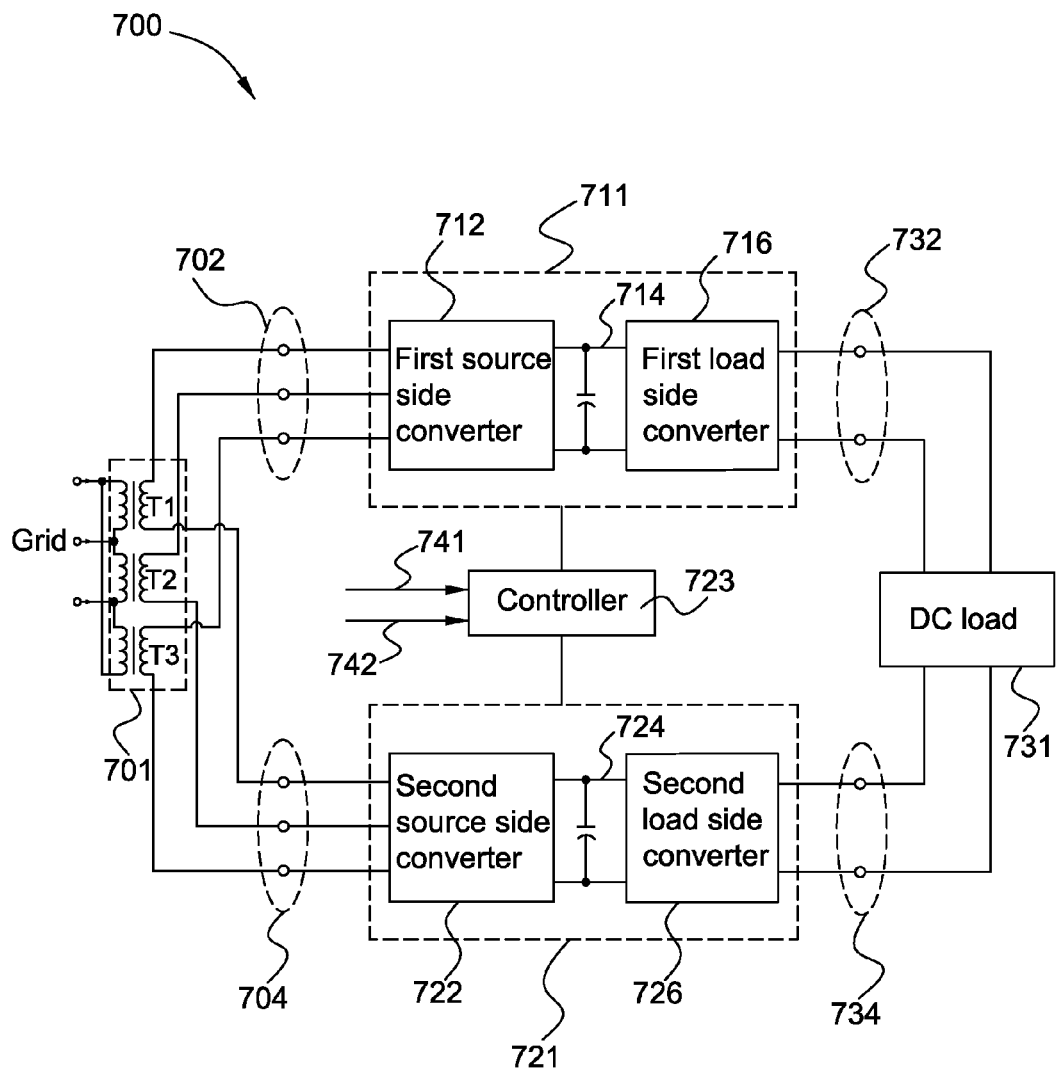
FIG. 7 is a schematic diagram of a power conversion system with a DC load as a load module in accordance with an illustrative embodiment.

Referring to FIG. 7, a schematic diagram of a power conversion system 700 with a DC load in accordance with an illustrative embodiment is shown. Compared with the power conversion system 600 shown in FIG. 6, similarly, the power conversion system 700 also includes a power source module 701, a first power conversion module 711, a second power conversion module 721, a controller 723, and a load module 731.

However, the load module 731 includes a DC load coupled between the first power conversion module 711 and the second conversion module 721 via first output terminals 732 and second output terminals 734 respectively.

FIGS. 2-5 illustrate a number of exemplary circuit structures for the power source module 101 that may be used in the power conversion system 100. The influence of the circuit structure of the power source module 101 on the switching signals will be described in detail below.

The first and second load side switching signals provided to the first inverter (e.g., 216) and the second inverter (e.g., 226) as shown in FIGS. 2-5 are generated based at least in part a voltage control strategy. Taking the power conversion system 200 shown in FIG. 2 for example, the corresponding output voltage space vectors of the first and second inverters 216, 226 can be controlled to have the same value with a reverse phase. Therefore, each first and corresponding second load side voltage references of each phase on the first and second inverters 216, 226 for modulation are:

$$\vec{V}_{f\_load\_ref} = \vec{V}_{s\_load\_ref} \quad (1),$$

where $\vec{V}_{f\_load\_ref}$ and $\vec{V}_{s\_load\_ref}$ represent a first load side voltage reference and a second load side voltage reference of one phase.

The first and second source side switching signals provided to the first converter (e.g., 212) and the second converter (e.g., 222) as shown in FIGS. 2-5 are generated based at least in part on the circuit structure of the power source module (e.g., 201) to control the first converter (e.g., 212) and the second converter (e.g., 222).

Taking the power conversion system 200 or the power conversion system 300 shown in FIG. 2 or FIG. 3 for example. The power source module (e.g., 201 or 301) includes a non-open-winding generator. A current control strategy for generating the first source side switching signals and the second source side switching signals is proposed to receive the same amount of the first input active power and the second input active power.

For example, the non-open-winding generator 201 shown in FIG. 2 is designed to provide the same source side voltage $\vec{V}_{source}$ to the first converter 212 and the second converter 222 at the points A, B, and C. In order to receive the same amount of the first input active power and the second input active power, the input current vector of the first and second converters 212, 222 should be controlled to have the same value with the same phase. Therefore, each first and second source side current references of each phase on the first and second converters 212, 222 for modulation are:

$$\vec{I}_{f\_source\_ref} = \vec{I}_{s\_source\_ref} \quad (2),$$

where $\vec{I}_{f\_source\_ref}$ and $\vec{I}_{s\_source\_ref}$ represent a first source side current reference and a second source side current reference of one phase. When the first source side current and the second source side current are controlled to be equal, the first input active power $P_{f\_source}$ and the second active input power $P_{s\_source}$ can be controlled to be equal.

The first output active power $P_{f\_load}$ is proportional to the first DC link voltage and the second output active power $P_{s\_load}$ is proportional to the second DC link voltage, which can be expressed by the following equation:

$$\begin{cases} P_{f\_load} = 1.5 \vec{V}_{f\_load} \cdot \vec{I}_{load} = 1.5 \left( \dfrac{V_{f\_DC\_fbk}}{V_{dc\_rated}} \right) \vec{V}_{f\_load\_ref} \cdot \vec{I}_{load} \\ P_{s\_load} = 1.5 \vec{V}_{s\_load} \cdot (-\vec{I}_{load}) = 1.5 \left( \dfrac{V_{s\_DC\_fbk}}{V_{dc\_rated}} \right) \vec{V}_{s\_load\_ref} \cdot (-\vec{I}_{load}) \end{cases} \quad (3)$$

where $\vec{I}_{load}$ represents load side current flowing through the first or the second load side converters 216, 226 via the transformer 231. $\vec{V}_{f\_load}$ and $\vec{V}_{s\_load}$ represent the first load side voltage vector and the second load side voltage vector respectively, $V_{f\_DC\_fbk}$ and $V_{s\_DC\_fbk}$ represent the first feedback DC link voltage and the second feedback DC link voltage respectively, and $V_{dc\_rated}$ represents a rated DC voltage of the first or second DC link.

From equation (1) and (3), it can be found that when the first feedback DC link voltage $V_{f\_DC\_fbk}$ is higher than that of the second feedback DC link voltage $V_{s\_DC\_fbk}$ the first the first inverter 216 will supply more power to the load module 231 and the first DC link voltage will decrease. When the first feedback DC link voltage $V_{f\_DC\_fbk}$ is lower than that of the second feedback DC link voltage $V_{s\_DC\_fbk}$, the second inverter 226 will supply more power to the load module 231 and the second DC link voltage will decrease. With the current control strategy, the first DC link voltage and the second DC link voltage can be balanced automatically.

Figure 8:
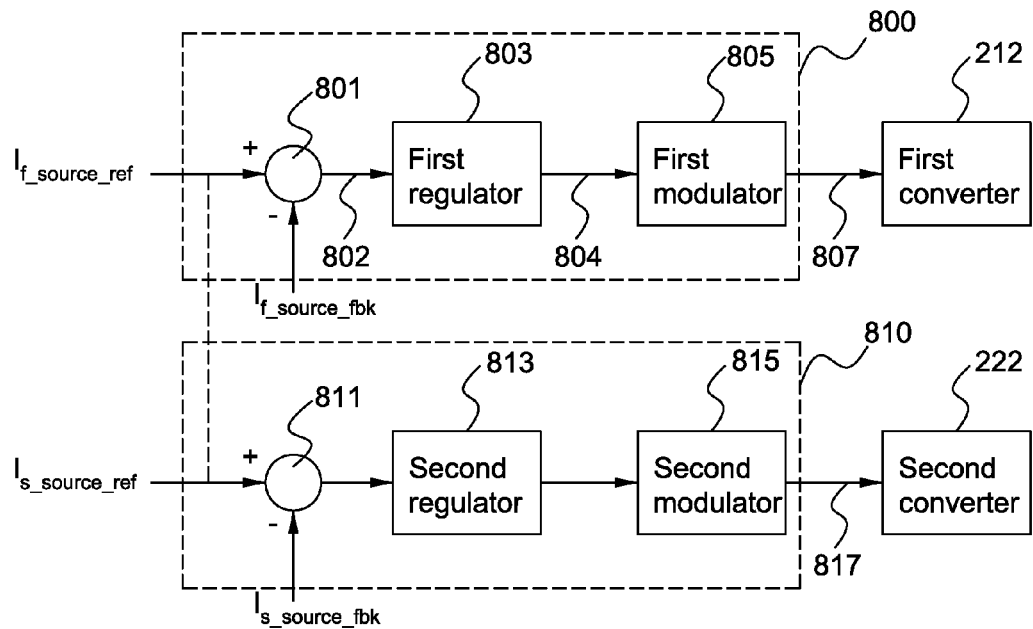
FIG. 8 is a control block diagram implemented by the first and second source side converters shown in FIGS. 2 and/or 3 for controlling current in accordance with an illustrative embodiment.

Referring to FIG. 8, a control block diagram implemented by the power conversion system 200 shown in FIG. 2 or the power conversion system 300 shown in FIG. 3 for controlling current in accordance with an illustrative embodiment is shown. Taking the power conversion system 200 for example, the source side switching signals generated by the controller 223 are provided to the first and second converters 212, 222 based at least in part on one or more first source side current references 241 and one or more second source side current references 242.

As indicated in FIG. 8, for example, for each phase of the generator 201, a first current control loop 800 and a second current control loop 810 are implemented by the controller 223 to generate the first source side switching signals 807 and the second source side switching signals 817 respectively. The first source side switching signals 807 are used to operate the first converter 212 for controlling a first source side feedback current signal $I_{f\_source\_fbk}$ to track a first source side current reference $I_{f\_source\_ref}$. Similarly, the second source side switching signals 817 are used to operate the second converter 222 for controlling a second source side feedback current signal $I_{s\_source\_fbk}$ to track a second source side current reference $I_{s\_source\_ref}$. In some embodiments, $I_{f\_source\_ref}$ and $I_{s\_source\_ref}$ have the same value. In some embodiments, $I_{f\_source\_fbk}$ and $I_{s\_source\_fbk}$ can be measured by sensors. For particular configurations, the sensors include resistors, hall-effect sensors, and fiber optic sensors.

As indicated in FIG. 8, the first current control loop 800 and the second current control loop 810 can be implemented in the same manner, for example, both of them include a summation element, a regulator, and a modulator. In some embodiments, other elements (e.g., magnitude limiting elements) can be added to the first current control loop 800 and/or the second current control loop 810. In a more specific application, in the first current control loop 800, a difference 802 is calculated by a subtraction of $I_{f\_source\_ref}$ and $I_{f\_source\_fbk}$ via a summation element 801. The difference 802 is sent to a first regulator 803 which outputs a signal 804. The signal 804 is sent to a first modulator 805 which is configured for generating the first source side switching signals 807 by implementing one or more modulation algorithms, such as a pulse width modulation (PWM) or a current hysteresis comparison algorithm.

For particular configurations, the second source side switching signals 817 from the second current control loop 810 are obtained in a similar manner as the first source side switching signals 807 from the first current control loop 800 shown in FIG. 8. For particular configurations, the second source side switching signals 817 are obtained in a different manner, that is, the first regulator 803 and a second regulator 813 are configured to implement different control algorithms such as a fuzzy algorithm and a neural network algorithm, respectively.

Then, the first source side switching signals 807 and the second source side switching signals 817 can be sent to the first converter 212 and the second converter 222 respectively to enable the two converters 212, 222 to receive the same amount of first input active power and second input active power. As a result, the first DC link voltage and the second DC link voltage can be balanced or maintained at the same value.

Taking the power conversion system 400 shown in FIG. 4 for example, the power conversion system 400 includes dual separate power sources in the power source module 401. A power control strategy for generating the first source side switching signals and the second source side switching signals is proposed to receive the same amount of the first input power and the second input power.

The source side switching signals generated by the controller 423 are provided to the first and second converters 412, 422 based at least in part on a first source side power reference $P_{f\_source\_ref}$ 441 and a second source side power reference $P_{s\_source\_ref}$ 442. Similar to the closed-loop control strategy shown in FIG. 8, the first source side switching signals 807 can be used to operate the first converter 412 for controlling a first source side feedback power signal $P_{f\_source\_fbk}$ to track a first source side power reference $P_{f\_source\_ref}$ and the second source side switching signals 817 can be used to operate the second converter 422 for controlling a second source side feedback power signal $P_{s\_source\_fbk}$ to track a second source side power reference $P_{s\_source\_ref}$.

For particular configurations, receiving the same amount of power can be achieved by controlling the first feedback current and/or voltage signals at the first converter 412 and second feedback current and/or voltage signals at the second converter 422 based at least in part on the current and/or voltage references.

Taking the power conversion system 500 shown in FIG. 5 for example, the power conversion system 500 includes an open-winding generator 501 in the power source module. A voltage control strategy for generating the first source side switching signals and the second source side switching signals is proposed to receive the same amount of the first input active power and the second input active power.

Figure 9:
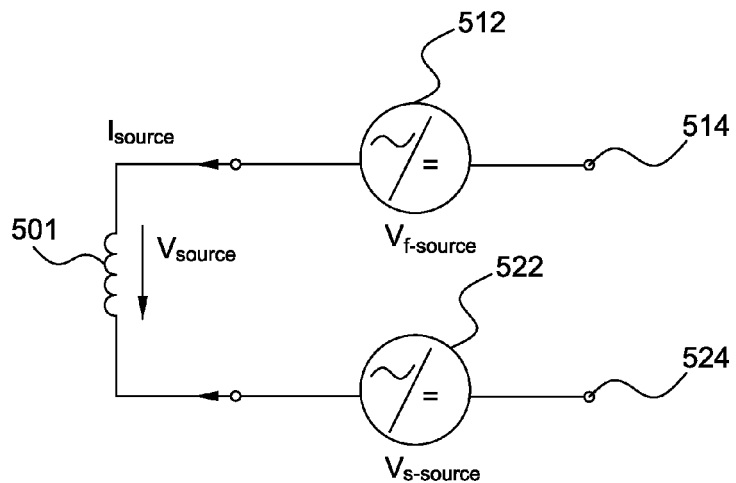
FIG. 9 is an equivalent circuit diagram of a part of a power conversion system with an open-winding power source module in accordance with an illustrative embodiment.

Referring to FIG. 9, an equivalent circuit diagram of a part of a power conversion system 500 with an open-winding generator 501 in accordance with an illustrative embodiment is shown. As indicated in FIG. 9, the first converter 512 and the second converter 522 are coupled in series with the open-winding generator 501 which means the inputs of the first converter 512 and the second converter 522 share a common current loop. Thus, the relationship of the current in the first converter 512 $\vec{I}_{f\_source}$ and the current in the second converter 522 $\vec{I}_{s\_source}$ is:

$$\vec{I}_{f\_source} = \vec{I}_{s\_source} \qquad (4),$$

The source side switching signals generated by the controller 523 are provided to the first and second converters 512, 522 based at least in part on one or more first source side voltage references 541 and one or more second source side voltage references 542. Similar to the closed-loop control strategy shown in FIG. 8, the first source side switching signals 807 can be used to operate the first converter 512 for controlling a first source side feedback voltage signal $V_{f\_source\_fbk}$ to track a first source side voltage reference $V_{f\_source\_ref}$ 541 and the second source side switching signals 817 can be used to operate the second converter 522 for controlling a second source side feedback voltage signal $V_{s\_source\_fbk}$ to track a second source side voltage reference $V_{s\_source\_ref}$ 542. A source side dynamic coefficient is set between each first source side voltage reference and each corresponding second source side voltage reference of each phase.

In some embodiments, $V_{f\_source\_ref}$ is not equal to $V_{s\_source\_ref}$ all the time due to the source side dynamic coefficient. In some embodiments, $V_{f\_source\_fbk}$ and $V_{s\_source\_fbk}$ can be measured by sensors. For particular configurations, the sensors include resistors, hall-effect sensors, and fiber optic sensors.

The amplitude of the source side dynamic coefficient will be regulated to one gradually and then the first DC link voltage and the second DC link voltage can be balanced. The source side dynamic coefficient changes based at least in part on the first feedback DC link voltage $V_{f\_source\_fbk}$ and the second feedback DC link voltage $V_{f\_source\_fbk}$. Setting the source side dynamic coefficient so as to get $V_{f\_source\_ref}$ and $V_{s\_source\_ref}$ will be illustrated in detail below.

For a specific application, the source side dynamic coefficient is calculated based at least in part on a ratio between the first feedback DC link voltage and the second feedback DC link voltage measured by one or more sensors.

In order to balance the two DC link voltages by the first and second converters, in one embodiment, the first source side voltage reference is fixed, and the second source side voltage reference is tuned using the following equation:

$$V_{s\_source\_ref} = -\frac{V_{f\_DC\_fbk}}{V_{s\_DC\_fbk}} V_{f\_source\_ref}, \quad (5)$$

where $V_{f\_DC\_fbk}$ and $V_{s\_DC\_fbk}$ represent the first feedback DC link voltage and the second feedback DC link voltage, respectively. In another embodiment, the second source side voltage reference is fixed, and the first source voltage reference is tuned using the following equation:

$$V_{f\_source\_ref} = -\frac{V_{s\_DC\_fbk}}{V_{f\_DC\_fbk}} V_{s\_source\_ref} \quad (6)$$

From equations (5) and (6), it can be found that the source side voltage references of the first and second converters should have opposite directions and have the source side dynamic coefficient.

For another specific application, the source side dynamic coefficient is calculated based at least in part on a difference between a first feedback DC voltage and a second feedback DC voltage. In this application, the source side dynamic coefficient is obtained by a regulator which will be described in detail below with respect to FIG. 10.

Figure 10:
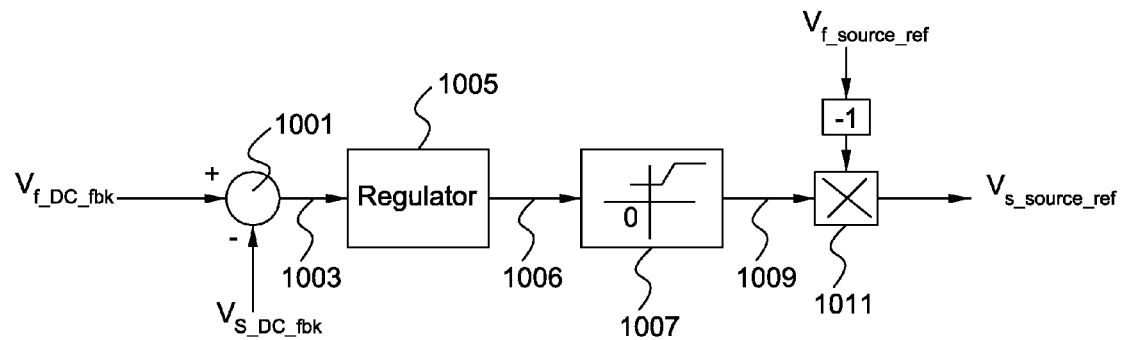
FIG. 10 is a schematic diagram for calculating a source side dynamic coefficient in accordance with an illustrative embodiment.

Referring to FIG. 10, a schematic diagram for calculating a source side dynamic coefficient 1009 in accordance with an illustrative embodiment is shown. As indicated in FIG. 10, the second feedback DC link voltage $V_{s\_DC\_fbk}$ is subtracted from the first feedback DC link voltage $V_{f\_DC\_fbk}$ via a summation element 1001 and a difference 1003 is sent to a regulator 1005. The regulator 1005 may be implemented by a proportion (P) control algorithm, a proportion and integration (PI) control algorithm or any other suitable control algorithms. In some embodiments, a limitation element 1007 is included. The limitation element 1007 receives a signal 1006 and outputs the source side dynamic coefficient 1009. When the signal 1006 is a negative value, the source side dynamic coefficient 1009 is a lower limited value, when the signal 1006 is a positive value, the source side dynamic coefficient 1009 is a corresponding positive value and the corresponding positive value has an upper limited value.

As indicated in FIG. 10, for example, the source side dynamic coefficient 1009 is multiplied by a negated signal of the first source side voltage reference $V_{f\_source\_ref}$ using a multiplication element 1011 to obtain the second source side voltage reference $V_{s\_source\_ref}$. In other embodiments, the source side dynamic coefficient 1009 is multiplied by a negated signal of the second source side input voltage reference $V_{s\_source\_ref}$, using the multiplication element 1011 to obtain the second source side input voltage $V_{f\_source\_ref}$.

FIGS. 6-7 illustrate a number of circuit structures for the load module 131 that may be used in the power conversion system 100. Control strategies may be implemented, that are similar to the three control strategies illustrated above for generating different first and second source side switching signals based on the circuit structure of the power source module 101. Three control strategies for generating different first and second load side switching signals based on the circuit structure of the load module 131 will be illustrated in detail below.

The voltage control strategy for generating the first and second load side switching signals shown in FIGS. 2-5 is used to generate the first and second source side switching signals in controlling the power conversion systems as shown in FIGS. 6-7. The input voltage space vector of the first and second converters 612, 622 (or the first and second source side converters 712, 722) can be controlled to have the same value with a reverse phase. Therefore, each first and corresponding second source side voltage references of each phase on the first and second converters 612, 622 for modulation are:

$$\vec{V}_{f\_source\_ref} = -\vec{V}_{s\_source\_ref} \quad (7),$$

where $\vec{V}_{f\_load\_ref}$ and $V_{s\_load\_ref}$ represent a first source side voltage reference and a second source side voltage reference of one phase.

Taking the power conversion system 600 shown in FIG. 6 for example, the motor may include a non-open-winding structure as the generator 201 shown in FIG. 2 or the generator 301 shown in FIG. 3. A current control strategy for generating the first load side switching signals and the second load side switching signals is proposed to provide the same amount of the first output active power and the second output active power to the non-open-winding motor 631.

Figure 11:
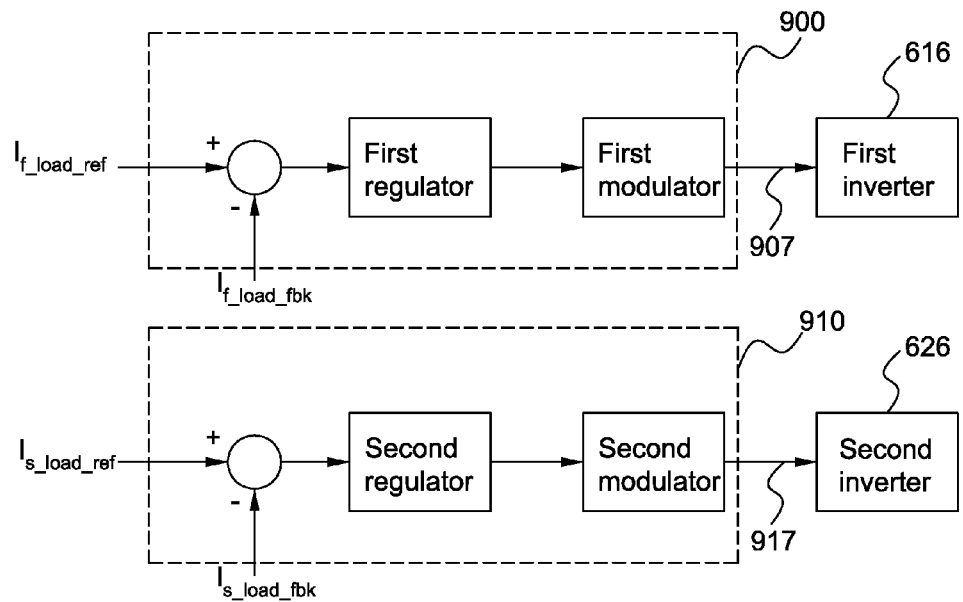
FIG. 11 is a control block diagram implemented by the first and second load side converters shown in FIG. 6 for controlling current in accordance with an illustrative embodiment.

Referring to FIG. 11, a control block diagram implemented by the power conversion system 600 with a non-open winding motor shown in FIG. 6 for controlling current in accordance with an illustrative embodiment is shown. The load side switching signals generated by the controller 623 are provided to the first and second inverters 616, 626 based at least in part on one or more first load side current references and one or more second load side current references.

As indicated in FIG. 11, for example, for each phase of the motor 631, a first current control loop 900 and a second current control loop 910, which are similar to the first current control loop 800 and the second current control loop 810 as shown in FIG. 8, are implemented by the controller 623 to generate the first load side switching signals 907 and the second load side switching signals 917 respectively. The first load side switching signals 907 are used to operate the first inverter 616 for controlling a first load side feedback current signal $I_{f\_load\_fbk}$ to track a first load side current reference $I_{f\_load\_ref}$ 641. Similarly, the second load side switching signals 917 are used to operate the second inverter 626 for controlling a second load side feedback current signal $I_{s\_load\_fbk}$ to track a second load side current reference $I_{s\_load\_ref}$ 642. For particular configurations, $I_{f\_load\_ref}$ and $I_{s\_load\_ref}$ have the same value. For particular configurations, $I_{f\_load\_fbk}$ and $I_{s\_load\_fbk}$ can be measured by sensors. For particular configurations, the sensors include resistors, hall-effect sensors, and fiber optic sensors.

Taking the power conversion system 700 shown in FIG. 7 for example, the power conversion system 700 includes a DC load 731. A power control strategy for generating the first load side switching signals and the second load side switching signals is proposed to provide the same amount of the first output power and the second output power to the DC load 731.

The load side switching signals generated by the controller 723 are provided to the first and second load side converters 716, 726 based at least in part on a first load side power reference $P_{f\_load\_ref}$ 741 and a second load side power reference $P_{s\_load\_ref}$ 742. Similar to the closed-loop control strategy shown in FIG. 11, the first load side switching signals 907 can be used to operate the first load side converter 716 for controlling a first load side feedback power signal $P_{f\_load\_fbk}$ to track a first load side power reference $P_{f\_load\_ref}$ and the second load side switching signals 917 can be used to operate the second load side converter 726 for controlling a second load side feedback power signal $P_{s\_load\_fbk}$ to track a second load side power reference $P_{s\_load\_ref}$.

For particular configurations, providing the same amount of power can be achieved by controlling the first feedback current and/or voltage signals at the first load side converter 716 and second feedback current and/or voltage signals at the second load side converter 726 based at least in part on the current and/or voltage references.

Taking the power conversion system 600 shown in FIG. 6 for example, the motor may include an open-winding structure as the generator 501 shown in FIG. 5. A voltage control strategy for generating the first load side switching signals and the second load side switching signals is proposed to provide the same amount of the first output active power and the second output active power to the open-winding motor 631.

Figure 12:
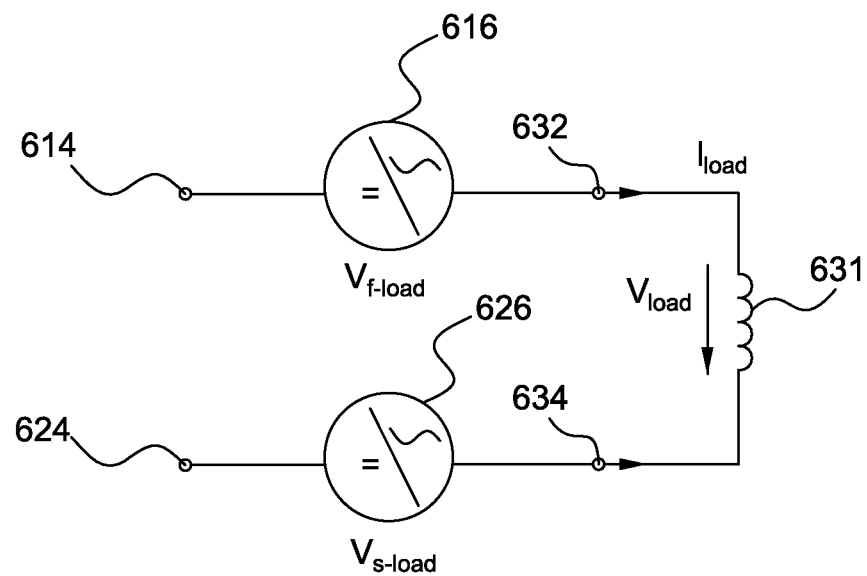
FIG. 12 is an equivalent circuit diagram of a part of a power conversion system with an open-winding motor as the load module in accordance with an illustrative embodiment.

Referring to FIG. 12, an equivalent circuit diagram of a part of a power conversion system 600 with an open-winding motor in accordance with an illustrative embodiment is shown. As indicated in FIG. 12, the first inverter 616 and the second inverter 626 are coupled in series with the open-winding motor 631 which means the outputs of the first inverter 616 and the second inverter 626 share a common current loop. Thus, the relationship of the current in the first inverter 616 $\vec{I}_{f\_load}$ and the current in the second inverter 626 $\vec{I}_{s\_load}$ is:

$$\vec{I}_{f\_load} = \vec{I}_{s\_load} \tag{8}$$

The load side switching signals generated by the controller 623 are provided to the first and second inverters 616, 626 based at least in part on one or more first load side voltage references and one or more second load side voltage references, respectively. Similar to the closed-loop control strategy shown in FIG. 11, the first load side switching signals 907 can be used to operate the first inverter 616 for controlling a first load side feedback voltage signal $V_{f\_load\_fbk}$ to track a first load side voltage reference $V_{f\_load\_ref}$. The second load side switching signals 917 can be used to operate the second inverter 626 for controlling a second load side feedback voltage signal $V_{s\_load\_fbk}$ to track a second load side voltage reference $V_{s\_load\_ref}$. A load side dynamic coefficient is set between a first load side voltage reference and a second load side voltage reference of each phase.

Similar to the source side dynamic coefficient set between the first source side voltage reference and the second source side voltage reference of each phase for controlling the power conversion system 500 shown in FIG. 5, the load side dynamic coefficient is calculated based at least in part on a ratio or a difference between the first feedback DC link voltage at the first DC link and the second feedback DC link voltage at the second DC link. Thus the details are omitted here.

When the load module 131 is a transformer used to provide electrical power to power grid, a carrier-based modulation method with different phase shifts is proposed to reduce the total harmonic distortion (THD) seen by the power grid. More specifically, the controller 123 is configured to implement the carrier-based modulation method with different phase shifts to generate load side switching signals for providing to the first load side converter 116 and the second load side converter 126.

Figure 13:
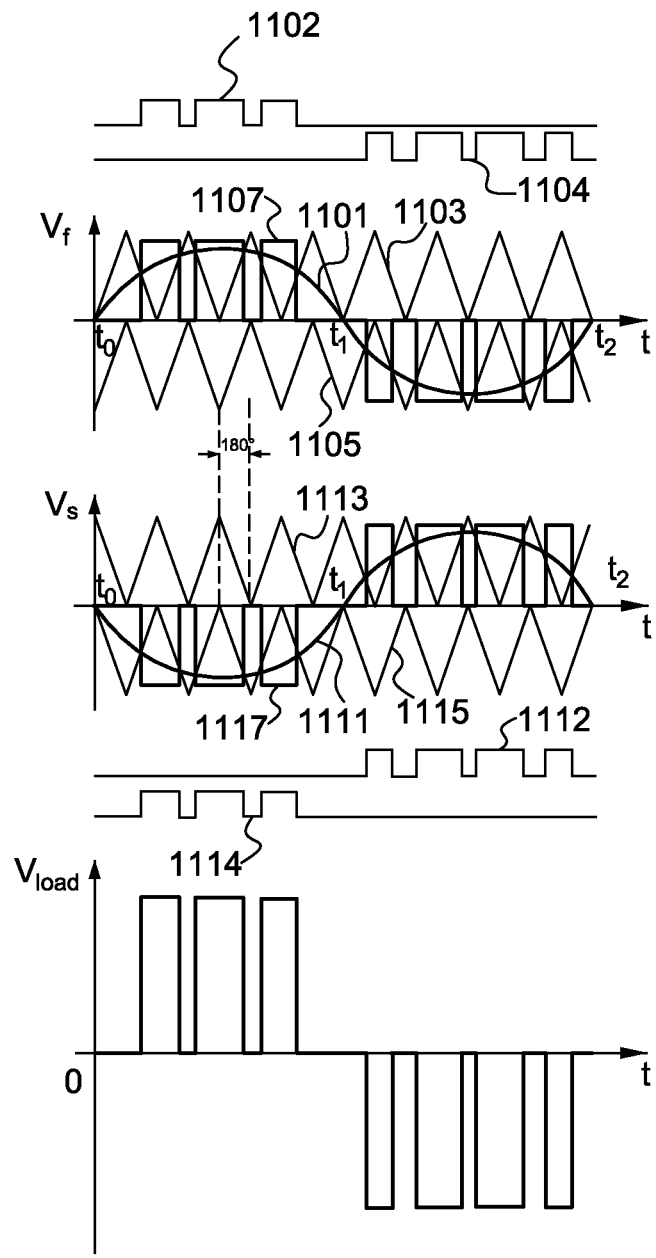
FIG. 13 is a waveform diagram illustrating various carrier and modulation waveforms of a carrier-based modulation method implemented by the power conversion system shown in FIG. 1 in accordance with an illustrative embodiment.

Referring to FIG. 13, a waveform diagram illustrating various carrier and modulation waveforms of a carrier-based modulation method used in the power conversion system shown in FIG. 1 in accordance with an illustrative embodiment is shown. Taking an open-winding transformer for example, as indicated in FIG. 13, a first modulation wave 1101, a first positive carrier wave 1103, and a first negative carrier wave 1105 are used to generate the first load side switching signals 1102, 1104. In a more specific application, the first modulation wave 1101 is a sinusoidal voltage wave, the first positive carrier wave 1103 is a triangular voltage wave, and the first negative carrier wave 1105 is a triangular voltage wave having the same phase with the first positive carrier wave 1103.

From time t0 to t1, when the first modulation wave 1101 is higher than the first positive carrier wave 1103, an on switching signal is generated, when the first modulation wave 1101 is lower than the first positive carrier wave 1103, an off switching signal is generated. From time t1 to t2, when the first modulation wave 1101 is higher than the first negative carrier wave 1105, an off switching signal is generated, when the first modulation wave 1101 is lower than the first negative carrier wave 1105, an on switching signal is generated. Then, the first load switching signals 1102, 1104 are generated for providing to the first load side converter 116. Then, the first voltage 1107 at the one or more first output terminals 132 can be obtained.

Similarly, second load side switching signals 1112, 1114 can be generated for providing to the second load side converter 126 by a comparison of the second modulation wave 1111 with the second positive carrier wave 1113 and a comparison of the second modulation wave 1111 with a second negative carrier wave 1115. Then, the second voltage 1117 at the one or more second output terminal 134 can be obtained.

As indicated in FIG. 13, the second positive carrier wave 1113 has a phase shift of 180° compared with the first positive carrier wave 1103. The second negative carrier wave 1115 has a phase shift of 180° compared with the first negative carrier wave 1105. The second modulation wave 1111 has a phase shift of 180° compared with the first modulation wave 1101. As a result, the voltage on the winding is a three-level wave which can be obtained by a subtraction of the first voltage 1107 and the second voltage 1117. According to a simulation result of the embodiment as shown in FIG. 1, for one converter in the topology, the THD in this situation is 0.32%.

Referring to FIG. 14, a waveform diagram illustrating various carrier and modulation waveforms of another carrier-based modulation method used in the power conversion system shown in FIG. 1 in accordance with an illustrative embodiment is shown. Compared with the carrier-based modulation method shown in FIG. 13, there is no difference among the first modulation wave 1201, the first positive carrier wave 1203, the first negative carrier wave 1205 and the second modulation wave 1211. However, a second positive carrier wave 1213 has a phase shift of 90° compared with the first positive carrier wave 1203. A second negative carrier wave 1215 has a phase shift of 90° compared with the first negative carrier wave 1205.

First load side switching signals 1202, 1204 and second load side switching signals 1212, 1214 are generated in the same generating manner as the first load switching signals 1102, 1104 and second load side switching signals 1112, 1114 illustrated in FIG. 13. The first load side switching signals 1202, 1204 are provided to the first load side converter 116 and the second load side switching signals 1212, 1214 are provided to the second load side converter 126.

The voltage on the winding is a five-level wave which can be obtained by a subtraction of a first voltage 1207 and a second voltage 1217. According to a simulation result of the embodiment as shown in FIG. 1, for one converter in the topology, the THD in this situation is 0.95%.

Referring to FIG. 15, a waveform diagram illustrating various carrier and modulation waveforms of another carrier-based modulation method used in the power conversion system shown in FIG. 1 in accordance with an illustrative embodiment is shown. Compared with the carrier-based modulation method shown in FIG. 13, there is no difference among the first modulation wave 1301, the first positive carrier wave 1303, the first negative carrier wave 1305 and the second modulation wave 1311. However, a second positive carrier wave 1313 has a phase shift of 0° compared with the first positive carrier wave 1303. A second negative carrier wave 1315 has a phase shift of 0° compared with the second negative carrier wave 1305.

First load side switching signals 1302, 1304 and second load side switching signals 1312, 1314 are generated in the same generating manner as the first load switching signals 1102, 1104 and second load side switching signals 1112, 1114 illustrated in FIG. 13. The first load side switching signals 1302, 1304 are provided to the first load side converter 116 and the second load side switching signals 1312, 1314 are provided to the second load side converter 126.

The voltage on the winding is a five-level wave which can be obtained by a subtraction of a first voltage 1307 and a second voltage 1317. According to a simulation result of the embodiment as shown in FIG. 1, for one converter in the topology, the THD in this situation is 1.22%.

From the embodiments shown in FIGS. 13-15, it can be found that the THD is reduced significantly when the phase shift between the first positive carrier wave 1103 and the second positive carrier wave 1113 is 180°.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this disclosure. It is, therefore, to be understood that the appended claims are intended to cover all such modifications and changes as fall within the true spirit of the invention.

Further, as will be understood by those familiar with the art, the present invention may be embodied in other specific forms without depending from the spirit or essential characteristics thereof. Accordingly, the disclosures and descriptions herein are intended to be illustrative, but not limiting, of the scope of the invention which is set forth in the following claims.

What is claimed is:

1. A power conversion system, comprising:
   a first power conversion module coupled with a power source module via one or more first input terminals, wherein the first power conversion module is configured to convert a first input power at the one or more first input terminals to a first output power at one or more first output terminals for providing to a load module, the first power conversion module comprising a first source side converter, a first load side converter, and a first DC link coupled between the first source side converter and the first load side converter;
   a second power conversion module coupled with the power source module via one or more second input terminals, wherein the second power conversion module is configured to convert a second input power at the one or more second input terminals to a second output power at one or more second output terminals for providing to the load module, the second power conversion module comprising a second source side converter, a second load side converter, and a second DC link coupled between the second source side converter and the second load side converter; and
   a controller in electrical communication with the first power conversion module and the second power conversion module, wherein the controller is configured to generate a number of switching signals according to a circuit structure of the power source module or a circuit structure of the load module, wherein the switching signals are provided to the first power conversion module and the second power conversion module to balance a first DC link voltage at the first DC link and a second DC link voltage at the second DC link.

2. The power conversion system of claim 1, wherein:
   the load module comprises an open-winding transformer configured to provide the first output power and the second output power to a power grid, wherein the open-winding transformer comprises an open-winding primary side and a secondary side, the open-winding primary side is coupled between the one or more first output terminals and the one or more second output terminals; and
   the switching signals comprise a number of first and second load side switching signals for providing to the first load side converter and the second load side converter respectively, wherein the first and second load side switching signals are generated according to one or more first load side voltage references and one or more second load side voltage references respectively, wherein each first load side voltage reference and each corresponding second load side voltage reference have the same value with a reverse phase.

3. The power conversion system of claim 1, wherein:
   the first and second input power are commonly supplied from a non-open-winding generator; and
   the switching signals comprise a number of first and second source side switching signals for providing to the first source side converter and the second source side converter respectively, wherein the first and second source side switching signals are generated according to one or more first source side current references and one or more second source side current references respectively, for receiving the same amount of first input active power and second input active power to balance the first DC link voltage and the second DC link voltage.

4. The power conversion system of claim 1, wherein:
   the first input power is supplied from a first power source of the power source module, the second input power is supplied from a second power source of the power source module, and the first power source and the second power source are separately arranged from each other; and the switching signals comprise a number of first and second source side switching signals for providing to the first source side converter and the second source side converter respectively, wherein the first and second source side switching signals are generated according to a first source side power reference and a second source side power reference respectively, for receiving the same amount of first input power and second input power to balance the first DC link voltage and the second DC link voltage.

5. The power conversion system of claim 1, wherein:
the first input power and the second input power are commonly supplied from an open-winding generator; and
the switching signals comprise a number of first and second source side switching signals for providing to the first source side converter and the second source side converter respectively, wherein the first and second source side switching signals are generated according to one or more first source side voltage references and one or more second source side voltage references respectively, for receiving the same amount of first input active power and second input active power to balance the first DC link voltage and the second DC link voltage, wherein a source side dynamic coefficient is set between each of the one or more first source side voltage references and each of the corresponding one or more second source side voltage references.

6. The power conversion system of claim 5, wherein the source side dynamic coefficient is calculated based at least in part on a ratio or a difference between a first feedback DC link voltage at the first DC link and a second feedback DC link voltage at the second DC link.

7. The power conversion system of claim 1, wherein:
the power source module comprises an open-winding transformer configured to receive the first input power and the second input power from a power grid, the open-winding transformer comprises a primary side and an open-winding secondary side, wherein the open-winding secondary side is coupled between the one or more first input terminals and the one or more second input terminals; and
the switching signals comprise a number of first and second source side signals for providing to the first source side converter and the second source side converter respectively, wherein the first and second source side signals are generated according to one or more first source side voltage references and one or more second source side voltage references respectively, wherein each of the first source side voltage references and each of the corresponding second source side voltage references have the same value with a reverse phase.

8. The power conversion system of claim 1, wherein:
the first output power and the second output power are commonly provided to a DC load; and
the switching signals comprise a number of first and second load side switching signals for providing to the first load side converter and the second load side converter respectively, wherein the first and second load side switching signals are generated according to a first load side power reference and a second load side power reference to provide the same amount of first output power and second output power, to balance the first DC link voltage and the second DC link voltage.

9. The power conversion system of claim 1, wherein:
the first output power and the second output power are commonly provided to an open-winding motor; and
the switching signals comprise a number of first and second load side switching signals generated according to one or more first load side voltage references and one or more second load side voltage references respectively, for providing the same amount of first output active power and second output active power to the motor to balance the first DC voltage and the second DC voltage, wherein a load side dynamic coefficient is set between each of the one or more first source side voltage references and each of the corresponding one or more second source side voltage references.

10. The power conversion system of claim 9, wherein the load side dynamic coefficient is calculated based at least in part on a ratio or a difference between a first feedback DC link voltage at the first DC link and a second feedback DC link voltage at the second DC link.

11. The power conversion system of claim 1, wherein:
the load module comprises a transformer for providing an output power obtained from the first output power and the second output power to a power grid; and
the switching signals comprise a number of first load side switching signals generated by comparing one or more first load side voltage references with one or more first carrier waves and a number of second load side switching signals generated by comparing one or more second load side voltage references with one or more second carrier waves, wherein a phase shift is set between each first carrier wave and each corresponding second carrier wave.

12. A method for controlling a power conversion system, the method comprising:
generating a number of switching signals according to a circuit structure of a power source module or a circuit structure of a load module; and
providing the number of switching signals to a first power conversion module and a second power conversion module to balance a first DC link voltage at a first DC link and a second DC link voltage at a second DC link.

13. The method of claim 12, comprising generating a number of first and second load side switching signals according to one or more first load side voltage references and one or more second load side voltage references when the load module comprises an open-winding transformer, wherein each of the first load side voltage references and each of the corresponding second load side voltage references have the same value with a reverse phase.

14. The method of claim 12, comprising generating a number of source side switching signals according to one or more first source side current references and one or more second source side current references to receive the same amount of first input active power and second input active power when the power source module is a non-open-winding generator.

15. The method of claim 12, comprising generating a number of source side switching signals according to one or more first source side voltage references and one or more second source side voltage references to receive the same amount of first input power and second input power when the power source module is an open-winding generator, wherein a source side dynamic coefficient is set between each of the one or more first source side voltage references and each of the corresponding second source side voltage references.

16. The method of claim 15, comprising calculating the source side dynamic coefficient based at least in part on a ratio or a difference between a first feedback DC link voltage at the first DC link and a second feedback DC link voltage at the second DC link.

17. The method of claim 12, comprising generating a number of first and second source side switching signals according to one or more first source side voltage references and one or more second source side voltage references when the power source module comprises an open-winding transformer, wherein each of the first source side voltage references and each of the corresponding second source side voltage references have the same value with a reverse phase.

18. The method of claim 12, comprising generating a number of load side switching signals according to one or more first load side current references and one or more second load side current references to provide the same amount of first output active power and second output active power when the load module is a non-open-winding motor.

19. The method of claim 12, comprising generating a number of load side switching signals according to one or more first load side voltage references and one or more second load side voltage references to provide the same amount of first output active power and second output active power when the load module is an open-winding motor, wherein a load side dynamic coefficient is set between each of the one or more first load side voltage references and each of the corresponding second load side voltage references.

20. A wind power conversion system, comprising:

a wind generator for providing a first input power at one or more first input terminals and a second input power at one or more second input terminals;

a first power conversion module coupled with the wind generator via the one or more first input terminals, wherein the first power conversion module is configured to convert the first input power to a first output power at one or more first output terminals for providing to a power grid, the first power conversion module comprising a first rectifier, a first inverter, and a first DC link coupled between the first rectifier and the first inverter;

a second power conversion module coupled with the wind generator via the one or more second input terminals, wherein the second power conversion module is configured to convert the second input power to a second output power at one or more second output terminals for providing to a load module, the second power conversion module comprising a second rectifier, a second inverter, and a second DC link coupled between the second rectifier and the second inverter; and a controller in electrical communication with the first power conversion module and the second power conversion module, wherein the controller is configured to generate a number of source side switching signals according to a winding-structure of the generator for providing to the first rectifier and the second rectifier, to reduce the voltage difference between a first DC link voltage at the first DC link and a second DC link voltage at the second DC link.

* * * * *